(12) United States Patent
Maruyama et al.

(10) Patent No.: US 6,527,904 B1
(45) Date of Patent: Mar. 4, 2003

(54) METHOD OF PRODUCING AN OPTICAL VIDEO DISC

(75) Inventors: Haruhisa Maruyama, Yamanashi-ken (JP); Masayuki Uno, Yamanashi-ken (JP); Hirotoshi Tabuchi, Yamanashi-ken (JP); Jiro Fujimori, Yamanashi-ken (JP); Masaaki Motokawa, Yamanashi-ken (JP)

(73) Assignees: Pioneer Electronic Corporation, Tokyo (JP); Pioneer Video Corporation, Yamanashi-ken (JP)

( * ) Notice: Subject to any disclaimer, the term of this patent is extended or adjusted under 35 U.S.C. 154(b) by 0 days.

(21) Appl. No.: 09/151,758

(22) Filed: Sep. 11, 1998

Related U.S. Application Data

(63) Continuation-in-part of application No. 08/959,977, filed on Oct. 29, 1997, now abandoned.

(30) Foreign Application Priority Data

Nov. 14, 1996 (JP) .............................. 8-318632
Jan. 30, 1997 (JP) ............................. 9-031349

(51) Int. Cl.[7] .............................. G11B 7/24; G11B 7/26; G11B 11/00
(52) U.S. Cl. ................................ 156/275.5; 156/275.3; 156/275.7; 156/285; 156/307.1; 156/307.7; 369/286
(58) Field of Search ........................... 156/275.3, 275.5, 156/275.7, 285, 150, 151, 307.1, 307.7; 369/286

(56) References Cited

U.S. PATENT DOCUMENTS

| | | | | |
|---|---|---|---|---|
| 4,871,601 A | * | 10/1989 | Miura et al. | |
| 4,990,208 A | * | 2/1991 | Kano | 156/275.3 |
| 5,146,438 A | * | 9/1992 | Harper | 369/286 X |
| 5,312,714 A | | 5/1994 | Ogawa | 369/286 |
| 5,673,251 A | * | 9/1997 | Suzuki et al. | 369/275.4 |
| 5,726,969 A | * | 3/1998 | Moriya et al. | 369/286 X |
| 5,728,250 A | | 3/1998 | Kakinuma | 156/275.7 |
| 5,759,332 A | * | 6/1998 | Itoigawa et al. | 156/273.5 |

FOREIGN PATENT DOCUMENTS

JP    8-203125    *    8/1996

* cited by examiner

*Primary Examiner*—Jeff H. Aftergut
(74) *Attorney, Agent, or Firm*—Arent, Fox, Kintner, Plotkin & Kahn

(57) ABSTRACT

The method of producing a two-disc laminated optical video disc, includes first forming, on a first substrate, a first reflecting film capable of partially reflecting and partially transmitting a laser beam. Next on a second substrate, a second reflecting film is formed having a reflectance higher than that of the first reflecting film. A liquid ultraviolet-setting resin is applied to the first reflecting film and/or the second reflecting film. The above treated first substrate and the second substrate are bonded together, with a light-transmissible middle layer interposed therebetween. The liquid ultraviolet-setting resin is solidified by means of an ultraviolet light directed from below the first substrate.

3 Claims, 6 Drawing Sheets

FIG.1
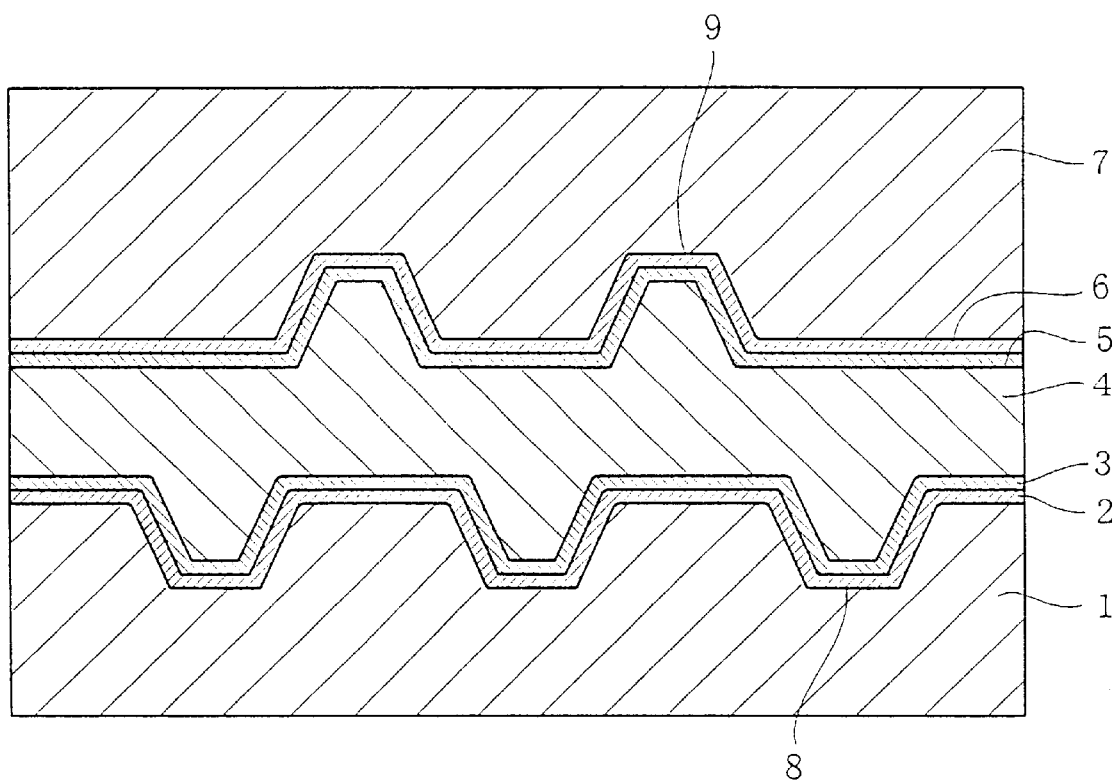
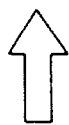
LASER BEAM

METHOD OF PRODUCING AN OPTICAL VIDEO DISC

This is a continuation in part application of U.S. patent application Ser. No. 08/959,977, filed on Oct. 29, 1997, now abandoned the disclosure of which is hereby incorporated by reference.

BACKGROUND OF THE INVENTION

The present invention relates to a method of producing an optical video disc, in particular to a method of producing a two-disc laminated optical video disc.

A conventional two-disc laminated optical video disc comprises a first disc having a first information recording surface and a second disc having a second information recording surface. The first disc and the second disc are bonded together by means of an adhesive agent of hot-melting type (a sort of hot-melt adhesive). In use, a laser beam is directed to pass through one disc (for example, the first disc) to irradiate the information recording surface thereof so as to read out the information recorded thereon. After the information recorded on said one disc (for example, the first disc) has been read out, the two-disc laminated optical video disc has to be turned upper side down so as to read out information recorded on the other disc (for example, the second disc). Alternatively, an optical head has to be moved to the other side of the two-disc laminated optical video-disc to read out information recorded on said other disc (for example, the second disc). Accordingly, an operation for reproducing a conventional two-disc laminated optical video disc is often considered to be troublesome.

In order to avoid the above troublesome operation, there has been suggested an improved tow-disc laminated optical video disc capable of reproducing information recorded on both discs by directing a laser beam in only one direction. In detail, a reflecting film formed on the information recording surface of one disc is made capable of partially reflecting and partially transmitting an incoming laser beam, whilst a middle layer of adhesive agent formed between the two discs is made complete light-transmissible.

However, in the manufacturing of the above two-disc laminated optical video disc, it is necessary either to use a liquid ultraviolet-setting resin as an adhesive agent layer, or to use a light-transmissible adhesive sheet as an adhesive agent layer.

In the former case, since it is easy for air to enter the adhesive agent layer, it is difficult to form an adhesive agent layer having a uniform thickness. In the later case, although it is easy to form an adhesive agent layer having a uniform thickness, some smuts or debris which are possible to exist between a disc substrate and a translucent reflecting film, will exert a stress force on the reflecting film, resulting in a problem such as a crack in the disc.

SUMMARY OF THE INVENTION

It is an object of the present invention to provide an improved method for efficiently producing a two-disc laminated optical video disc capable of reproducing information recorded on both discs by directing a laser beam in only one direction, so as to solve the above-mentioned problem peculiar to the above-mentioned prior art.

According to the present invention, there is provided a method of producing a two-disc laminated optical disc, comprising steps of: forming, on an information recording surface of a first light-transmissible substrate, a first reflecting film capable of partially reflecting and partially transmitting a laser beam; forming, on an information recording surface of a second light-transmissible substrate, a second reflecting film having a reflectance higher than that of the first reflecting film; applying a liquid ultraviolet-setting resin to the first reflecting film formed on the first light-transmissible substrate and/or the second reflecting film formed on the second light-transmissible substrate, in order to form a protection film(s) thereon; bonding together the above treated first light-transmissible substrate and the second light-transmissible substrate, with a light-transmissible middle layer interposed therebetween; solidifying the liquid ultraviolet-setting resin on the first light-transmissible substrate, by means of an ultraviolet light directed from below the first light-transmissible substrate.

According to one aspect of the present invention, before bonding together the first light-transmissible substrate and the second light-transmissible substrate, the liquid ultraviolet-setting resin is applied to the first reflecting film formed on the first light-transmissible substrate, followed by irradiation with an ultraviolet light. Alternatively, before bonding together the first light-transmissible substrate and the second light-transmissible substrate, the liquid ultraviolet-setting resin is applied to the second reflecting films formed on the second light-transmissible substrate, followed by irradiation with an ultraviolet light.

According to another aspect of the present invention, the light-transmissible middle layer is a light-transmissible sheet.

Before bonding together the first light-transmissible substrate and the second light-transmissible substrate, the light-transmissible sheet is laminated on the second reflecting film formed on the second light-transmissible substrate. Alternatively, before bonding together the first light-transmissible substrate and the second light-transmissible substrate, the light-transmissible sheet is laminated on the second protection film (hardened) formed over the second reflecting film of the second light-transmissible substrate.

On the other hand, it is also possible that before bonding together the first light-transmissible substrate and the second light-transmissible substrate, the light-transmissible sheet is laminated on the first reflecting film formed on the first light-transmissible substrate. Alternatively, before bonding together the first light-transmissible substrate and the second light-transmissible substrate, the light-transmissible sheet is laminated on the first protection film (hardened) formed over the second reflecting film of the first light-transmissible substrate.

According to a further aspect of the present invention, the liquid ultraviolet-setting resin has a viscosity of 15–400 cps under room temperature and in an unhardened state, and a thickness of 5–10 $\mu$m in an unhardened state.

According to a still further aspect of the present invention, the light-transmissible middle layer is formed by an ultraviolet-hardening film, which has a viscosity of 3,500–400,000 P under room temperature and in an unhardened state, and a thickness of 30–60 $\mu$m in an unhardened state. In practice, the light-transmissible middle layer formed by the ultraviolet-hardening film is hardened by means of an ultraviolet light directed from below the first light-transmissible substrate.

According to one more aspect of the present invention, the light-transmissible middle layer is formed by an light-transmissible adhesive sheet having a thickness of 30–60 $\mu$m.

According to one more aspect of the present invention, the first reflecting film capable of partially reflecting and partially transmitting a laser beam, is a metal film or a dielectric film.

According to one more aspect of the present invention, the step of bonding together the first light-transmissible substrate and the second light-transmissible substrate, is carried out in a vacuum condition.

According to one more aspect of the present invention, said method further comprises a step of using an ultraviolet light to irradiate the unhardened ultraviolet-setting resin applied to the first reflecting film formed on the first light-transmissible substrate, except a part of the resin applied to an outer circumferential area of the reflecting film.

According to one more aspect of the present invention, the first light-transmissible substrate and the second light-transmissible substrate are bonded together first in a vacuum condition, then by means of a pressure which is so adjusted that there will be no any outward movement of the liquid ultraviolet-setting resin.

According to one more aspect of the present invention, the first light-transmissible substrate and the second light-transmissible substrate are bonded together first in a vacuum condition, then by means of press using a high pressure air.

The above objects and features of the present invention will become more understood from the following description with reference to the accompanying drawings.

BRIEF DESCRIPTION OF DRAWINGS

FIG. 1 is a cross sectional view illustrating a structure of a two-disc laminated optical video disc produced in a method according to the present invention.

DETAILED DESCRIPTION OF THE PREFERRED EMBODIMENTS

Figure 2:
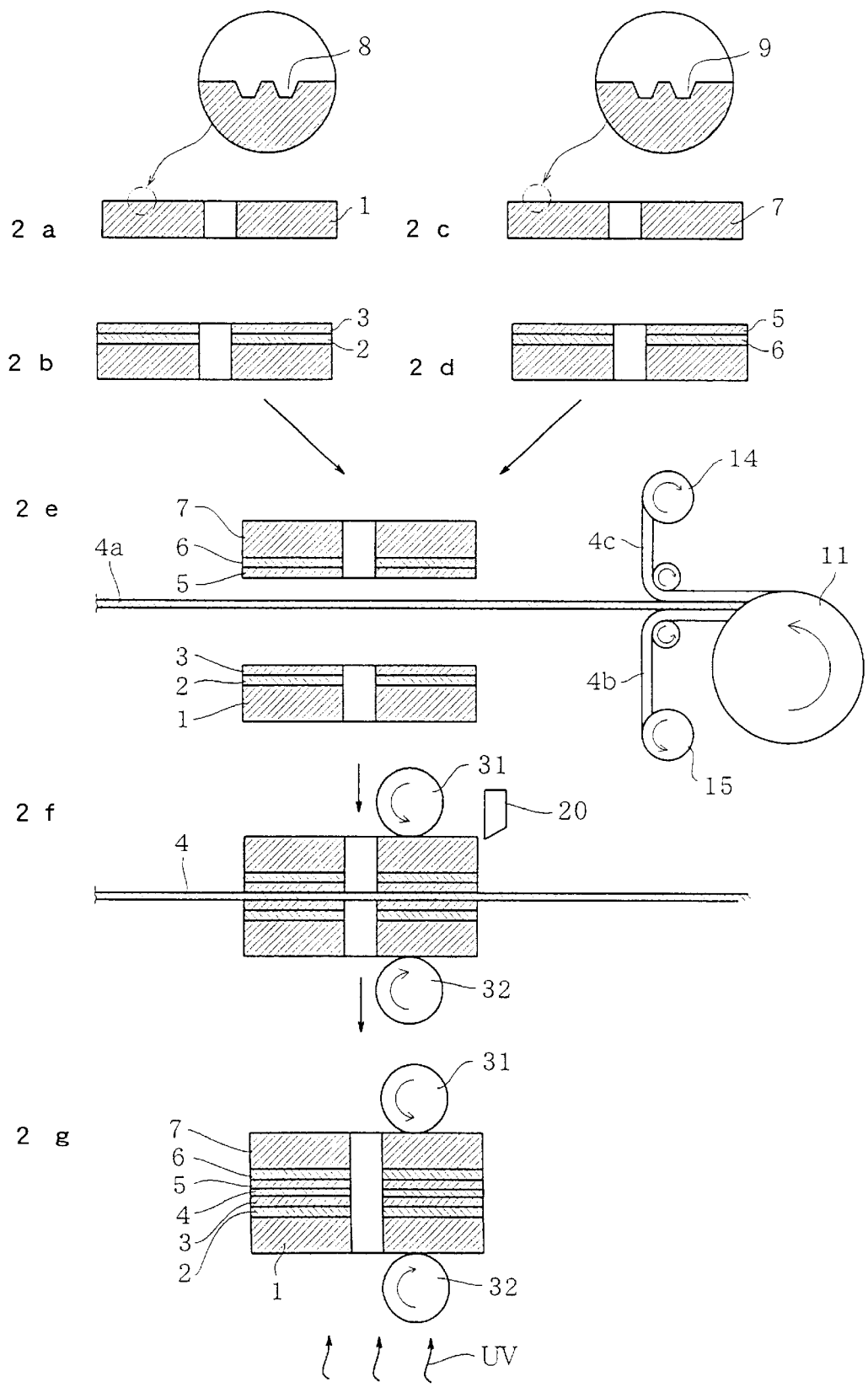
FIGS. 2a–2g are explanatory views illustrating a method of producing a two-disc laminated optical video disc, according to a first embodiment of the present invention.

Referring to FIG. 1, a two-disc laminated optical video disc produced in a method according to the present invention, has a laminated structure which includes: a first light-transmissible substrate 1, a first reflecting film 2, a first protection film 3, a middle layer 4, a second protection film 5, a second reflecting film 6, a second light-transmissible substrate 7. A first sort of information pits 8 are formed on the surface (facing the first reflecting film 2) of the first light-transmissible substrate 1. A second sort of information pits 9 are formed on the surface (facing the second reflecting film 6) of the second light-transmissible substrate 7. The two sorts of the information pits 8 and 9 have been processed into shapes capable of being read out by a laser beam directed from below the first light-transmissible substrate 1 in FIG. 1.

The first light-transmissible substrate 1 and the second light-transmissible substrate 7 are made of a light-transmissible material which may be a transparent resin such as PC (polycarbonate) or PMMA (polymethyl methacrylate), or an optical glass.

In particular, since PC (polycarbonate) is excellent in weather resistance and stable in size, PC is considered to be the most suitable to make a light-transmissible substrate.

Where a transparent resin is used to make the light-transmissible substrates 1 and 7, it is necessary to employ a metal mold with a stamper installed in its cavity, so as to produce an integrally formed substrate having information pits formed on one surface thereof, using a process called injection molding formation.

The shape and size of each light-transmissible substrate may be decided in accordance with what it is to be used for. If it is to be used as a substrate for making a digital video disc, each of the light-transmissible substrates 1 and 7 shall be made into a disc having a diameter of 120 mm, a center hole having a diameter of 15 mm, and a thickness of 0.6 mm.

The information pits 7 and 8 formed on the first and second light-transmissible substrates 1 and 2, have a depth of 0.02–1 $\mu$m, preferably 0.05–0.3 $\mu$m. If the pit depth is less than 0.02 $\mu$m, it will be difficult to read out information recorded thereon. On the other hand, if the pit depth is larger than 1 $\mu$m, there will not be any additional effects resulting from such deep pits.

Since it is necessary for a laser beam directed from below (as viewed in FIG. 1) the first light-transmissible substrate 1 to reach the information pits 9 formed on the second light-transmissible substrate 9, the first reflecting film 2 laminated on the first substrate 1 is a translucent film which is capable of partially transmitting and partially reflecting an incoming laser beam. Thus, when manufacturing a two-disc laminated optical disc shown in FIG. 1, an ultraviolet light may be caused to pass through the first reflecting film 2 so as to reach the middle layer 4 (not yet hardened) to promote the hardening thereof.

The first reflecting film 2 may be either a metal film such as Au, Ag, Ni and Al, or a dielectric film such silicone carbide and silicone nitride, having a thickness of 100–200 angstroms. Such a metal film or a dielectric film may be formed as reflecting film on the first light-transmissible substrate 1 in a method called sputtering or a method called ion-plating.

On the other hand, the second reflecting film 6 laminated on the second light-transmissible substrate 7 is different from the first reflecting film 2, i.e., without having to be made translucent (capable of partially transmitting and partially reflecting an incoming laser beam). In practice, the second reflecting film 6 may be a metal film such as Al, Al alloy, Au, Ag, Cub, preferably Al or Al alloy. Such a metal film may be formed as reflecting film on the second light-transmissible substrate 7, using a method called sputterring, a method called vacuum deposition or a method called ion-plating, having a thickness of 0.05–0.2 $\mu$m, preferably 0.08–0.12 $\mu$m.

The first protection film 3 laminated on the first reflecting film 2 and the second protection film 5 laminated on the second reflecting film 6, are useful for protecting the first reflecting film 2 and the second reflecting film 6.

Similarly, the first protection film 3 and the second protection film 5 are necessary to be capable of at least partially transmitting an incoming laser beam.

Preferably, the first protection film 3 and the second protection film 5, have substantially 100% light-transmissibility, i.e., have no any undesired influences on the transmissibility of a laser beam or an ultraviolet light.

The protection films 3 and 5 may be a film of an ultraviolet-setting resin. In practice, the ultraviolet-setting resin may be applied to the reflecting films 2 and 6 by virtue of a method called spin coating. In the present invention, the ultraviolet-setting resin, under a condition of a room temperature and before hardening, has a viscosity of 15–400 cps, preferably 15–50 cps, and a thickness of 5–10 μm.

It has been found that the above viscosity range of 15–400 cps is important, for a reason that if the viscosity is more than 400 cps, it will be difficult for air bubbles to escape from the protection films 3 and 5 when the two discs are being bonded together.

The middle layer 4 is a light-transmissible sheet having a thickness of 30–60 μm, preferably 50 μm. In practice, the middle layer 4 may be an light-transmissible adhesive sheet made of a light-transmissible acrylic adhesive agent. Alternatively, the middle layer 4 may be a light-transmissible ultraviolet-hardening film.

In a case where a light-transmissible ultraviolet-hardening film is used to form the middle layer 4, it will be disposed, in an unhardened state and in the form of a film, into a position between the two protection films 3 and 5. Then, by means of irradiation of ultraviolet light, the light-transmissible ultraviolet-hardening film becomes hardened so as to form the middle layer 4. In the present invention, the light-transmissible ultraviolet-hardening film, under a room temperature and before hardening, has a viscosity of 3,500–400,000 P.

If the middle layer 4 (using a light-transmissible adhesive sheet) has a thickness of less than 5 μm, two information recording surfaces (having numerous information pits and grooves formed thereon) of the two disc substrates will be to close to each other. As a result, when the information recording surface of the second light-transmissible substrate 7 is being irradiated with a laser beam, there will be an undesired influence from the information recording surface of the first light-transmissible substrate 1. On the other hand, if the middle layer 4 (using a light-transmissible ultraviolet-hardening film) has a thickness of more than 200 μm, there will be too large a stress caused due to the hardening and contraction of the ultraviolet-hardening film.

Further, if a light-transmissible ultraviolet-hardening film has a viscosity of less than 3,500 P, it will be in an almost liquid state and is difficult to be kept at a film form, resulting in too large a contraction during hardening. On the other hand, if a light-transmissible ultraviolet-hardening film has a viscosity of more than 400, 000 P, it will be difficult for air bubbles happened during disc production to escape therethrough, also will it be difficult for a finally formed middle layer 4 to have a sufficient adhesion to adhere to the protection films 3 and 5.

The light-transmissible ultraviolet-hardening film is made of an ultraviolet-hardening resin composition having a high molecular weight, which may be manufactured through cross-linking reaction and/or polymerization. Such a resin composition is for example a photo-sensitive resin composition of photo polymerization type.

The above photo-sensitive resin composition of photo polymerization type contains ethylenic unsaturized monomer(s), photo polymerization initiator(s), and binder polymer(s).

What can be used as an ethylenic unsaturized monomer may include, for example, t-butylacrylate, 1,5-pentanediol diacrylate, N,N-diethylamino ethylacrylate, ethyleneglycol diacrylate, 1,3-propanediol diacrylate, decamethyleneglycol diacrylate, decamethyleneglycol dimethacrylate, 1,4-cyclohexenediol diacrylate, 2,2-dimethylolpropane diacrylate, glycerol triacrylate, tripropyleneglycol diacrylate, pentaerythritol triacrylate, polyoxyethyl trimethylolpropane triacrylate, polyoxyethyl trimethylolpropane trimethacrylate, 2,2-di(p-hydroxyphenyl)-propane dimethacrylate, pentaerythritol tetraacrylate, triethyleneglycol diacrylate, polyoxyethyl-2,2-di(p-hydroxyphenyl)-propane dimethacrylate, triethyleneglycol dimethacrylate, polyoxypropyl trimethylolpropane triacrylate, ethyleneglycol dimethacrylate, buthyleneglycol dimethacrylate, 1,3-propanediol methacrylate, 1,2,4-butanetriol trimethacrylate, 2,2,4-trimethyl-1,3-pentanediol dimethacrylate, pentaerythritol tetramethacrylate, trimethylolpropane trimethacrylate, butanetriol trimethacrylate, 1,5-pentanediol dimethacrylate.

The above ethylenic unsaturized monomers may be used in single form or in combination including two or more.

The above photo-sensitive resin composition of photo polymerization type contains ethylenic unsaturized monomer(s) in an amount of 5–90% by weight, preferably 15–50% by weight.

What can be used as a photo polymerization initiator may include, for example, a polynuclear quinone such as 9,10-anthraquinone, 1-chloroanthraquinone, 2-chloroanthraquinone, 2-methylanthraquinone, 2-ethylanthraquinone, 2-t-buthylanthraquinone, octamethylanthraquinone, 1,4-naphthoquinone, 9,10-phenanthorequinone, 1,2-benzanthraquinone, 2,3-benzanthraquinone, 2-methyl-1,4-naphthoqui none, 2,3-di chloronaphthoqui none, 1,4-dimethylanthraquinone, 2,3-dimethylanthraquinone, 2,3-diphenylanthraquinone, 2-phenylanthraquinone, sodium salt of anthraquinone-α-sulfonic acid, 3-chloro-2-methylanthraquinone, retenequinone, 7,8,9,10-tetrahydronaphthacenequinone.

What can be used as a photo polymerization initiator may further include, for example, benzoin, pivaloin, acyloinether, α-hydrocarbon-substitued aromatic acyloin, phenazine, oxazine, Michlers' ketone, benzophenone, cyclohexadiene.

In addition, a sensitizer may be used in combination with any one or two of the above photo polymerization initiators.

The above photo polymerization initiators may be used in single form or in combination including two or more.

The above photo-sensitive resin composition of photo polymerization type contains photo polymerization initiator(s) in an amount of 0.5–30% by weight, preferably 1–5% by weight.

What can be used as a binder polymer may include, for example, polymethyl methacrylate, polyethyl methacrylate, polyvinylacetate, vinylacetate/acrylate copolymer, vinylacetate/methacrylate copolymer, ethylene/vinylacetate copolymer, polystyrene, vinylidene chloride/acrylnitrile copolymer, copolymer of vinylidene chloride/methacrylate and vinylidene chloride/vinylidene acetate; polyvinyl chloride, butadiene/acrylnitrile copolymer, acrylnitrile/butadiene/styrene copolymer, methacrylate/acrylnitrile/butadiene/styrene copolymer, 2-chlorobutadiene-1,3-polymer, rubber chloride, styrene/butadiene/styrene block copolymer, styrene/isoprene/styrene block copolymer, epoxide containing acrylate and methacrylate radicals, polyester, polyamide, cellulose ester, cellulose ether, polycarbonate, polyvinylacetate, polyformaldehyde.

The above binder polymers may be used in single form or in combination including two or more.

The above photo-sensitive resin composition of photo polymerization type contains binder polymer(s) in an amount of 5–90% by weight, preferably 15–50% by weight.

Further, the photo-sensitive resin composition of photo polymerization type is allowed to contain a plasticizer, a thickener, an ultraviolet-light absorbing agent, an antioxidant, an optical bleaching agent, a thermal stabilizer, and a release agent, provided that the light-transmissible ultraviolet-hardening film can keep its viscosity (under room temperature) within the above prescribed range.

In particular, the photo-sensitive resin composition of photo polymerization type contains the plasticizer in an amount of 0–25% by weight, preferably 5–15% by weight, with each of other additives being in an amount of 0–5% by weight, preferably 14% by weight.

In addition to the above-described photo-sensitive resin composition of photo polymerization type, a photo-sensitive resin composition of dimerization type or a photo-sensitive resin composition of light-crosslinking type may also be used to form the light-transmissible ultraviolet-hardening film.

In a manufacturing process, the above light-transmissible adhesive sheet or the light-transmissible ultraviolet-hardening film is disposed in the form of a sheet into a position between the first and second protection films 3 and 5, so as to form the middle layer 4. In this way, the adhesive sheet or the ultraviolet-hardening film will adhere to the protection films 3 and 5 by virtue of the adhering force of the sheet or the film, thus forming the middle layer 4.

Upon hardening, the adhesive sheet or the ultraviolet-hardening film will have an index of refraction of 1.40–1.60. Preferably, a difference between the index of refraction in the adhesive sheet (or the ultraviolet-hardening film) and the index of refraction in the first (or second) light-transmissible substrates 1, 7, is 0.05 or less.

Referring to FIG. 1, the information formed as information pits 8 on the first light-transmissible substrate 1 and the information formed as information pits 9 on the second light-transmissible substrate 7, may be read out by a laser beam irradiating from below (as viewed in FIG. 1) the first light-transmissible substrate 1.

FIGS. 2a–2g are explanatory views illustrating a method of producing a two-disc laminated optical video disc, according to a first embodiment of the present invention.

Referring to FIG. 2a, a first light-transmissible substrate 1 is prepared which has information pits 8 formed on one surface thereof. The information pits 8 are so formed on the substrate 1 that they may be read out by a laser beam coming from one side of the substrate 1 opposite to the information recording surface thereof.

In practice, the first light-transmissible substrate 1 is produced in an injection molding machine including a stamper installed in a cavity thereof, in an injection molding process using a transparent resin such as polycarbonate.

Then, as shown in FIG. 2b, a first reflecting film 2 and a first protection film 3 are successively formed on the information recording surface of the first substrate 1.

The first reflecting film 2 is required to partially transmit an incoming laser beam. Preferably, it is required that 30% of the incoming laser beam be reflected and 60% thereof be transmitted through the reflecting film 2. A material to form the first reflecting film 2 is a metal film which is thinner than a usual reflecting film. In detail, the first reflecting film 2 may be either a metal film such as Au, Ag, Ni and Al, or a dielectric film such as silicone carbide and silicone nitride, having a thickness of 100–200 angstroms. Such a metal or dielectric film may be formed on the first light-transmissible substrate 1 by virtue of a method called sputterring, a method called vacuum deposition, or a method called ion-plating.

Similarly, the second reflecting film 6 may be formed on the second light-transmissible substrate 7, also by virtue of a method called sputterring, a method called vacuum deposition, or a method called ion-plating.

The first protection film 3 is also required to at least partially transmit an incoming laser beam, preferably to have substantially 100% light transmissibility, i.e., have no any undesired influence on the transmissibility of a laser beam or an ultraviolet light.

In practice, the first protection film 3 is formed on the first reflecting film 2, the second protection film 5 is formed on the second reflecting film 6. In actual process, an ultraviolet-setting resin may be applied to the reflecting films 2 and 6 by virtue of a method called spin coating. In the present invention, the ultraviolet-setting resin, under a condition of a room temperature and before hardening, has a viscosity of 15–400 cps, preferably 15–50 cps, and a thickness of 5–10 $\mu$m.

The first protection film 3 laminated on the first reflecting film 2 and the second protection film 5 laminated on the second reflecting film 6, are useful for protecting the first reflecting film 2 and the second reflecting film 6, especially useful before a middle layer 4 is formed between two disc substrates.

After passing through the steps shown in FIGS. 2a and 2b, a half-finished disc product having laminated thereon the first reflecting film 2 and the first protection film 3 is obtained.

After passing through the steps shown in FIGS. 2c and 2d, a half-finished disc product having laminated thereon the second reflecting film 6 and the second protection film 5 is obtained.

The steps shown in FIGS. 2a and 2b are conducted at the same time as the steps shown in FIGS. 2c and 2d.

Referring to FIG. 2c, a second light-transmissible substrate 7 is prepared which has information pits 9 formed on one surface thereof. The information pits 9 are so formed on the substrate 7 that they may be read out by a laser beam irradiating from below (as viewed in FIG. 1) the first light-transmissible substrate 1.

Similarly, the second light-transmissible substrate 7 is produced in an injection molding machine including a stamper installed in a cavity thereof, by virtue of an injection molding process using a transparent resin such as polycarbonate.

Referring to FIG. 2d, the second reflecting film 6 laminated on the second light-transmissible substrate 7 is different from the above first reflecting film 2, i.e., without necessity of being made translucent (capable of partially transmitting and partially reflecting an incoming laser beam). In practice, the second reflecting film 6 may be a metal such as Al, Al alloy, Au, Ag, Cub, preferably Al or Al alloy. Such a metal film may be formed as reflecting film on the second light-transmissible substrate 7 by virtue of a method called sputterring, a method called vacuum deposition or a method called ion-plating, having a thickness of 0.05–0.2 $\mu$m, preferably 0.08–0.12 $\mu$m.

Similar to the first protection film 3, the second protection film 5 is also necessary to be capable of at least partially transmitting an incoming laser beam. Further, similar to the first protection film 3, the second protection film 5 preferably has a substantially 100% light transmissibility, i.e., have no any undesired influence on the transmissibility of a laser beam or an ultraviolet light.

Referring to FIG. 2e, a half-finished disc product produced in the steps of FIGS. 2a–2b and a half-finishied disc product produced in the steps of FIGS. 2c–2d, are positioned in a manner such that their protection films 3 and 5 are facing each other. Then, a light-transmissible sheet 4a is disposed between the two protection films 3 and 5.

The light-transmissible sheet 4a is either a light-transmissible adhesive sheet made from a light-transmissible acrylic adhesive agent, or a light-transmissible ultraviolet-hardening film which in an unhardened state has a thickness of 30–60 µm. In a case where a light-transmissible ultraviolet-hardening film is employed, when in an unhardened state and under a room temperature, it has a viscosity of 3,500–400,000 P, preferably 20,000–400,000 P. In fact, the light-transmissible ultraviolet-hardening film contains substantially no solvent and may undergo hardening upon being irradiated with an ultraviolet light.

If, under a room temperature and in an unhardened state, the light-transmissible ultraviolet-setting film has a viscosity of less than 3,500 P, it will be in a liquid state and is difficult to be kept at a film form, resulting in too large a contraction during hardening. On the other hand, if the light-transmissible ultraviolet-hardening film has a viscosity of more than 400,000 P under same conditions as above, it will be difficult for air bubbles occurred during disc production to escape therethrough, also will be difficult for a finally formed middle layer 4 to have a sufficient adhesion to adhere to the protection films 3 and 5.

The middle layer 4 has a thickness of 30–60 µm, preferably 50 µm. If the middle layer 4 has a thickness of less than 5 µm, two information recording surfaces (having numerous information pits formed thereon) of the two half-finished disc products will be too close to each other. As a result, when the information recording surface of the second light-transmissible substrate 7 is being irradiated with a laser beam, there will be an undesired influence from the information recording surface of the first light-transmissible substrate 1. On the other hand, where a light-transmissible ultraviolet-hardening film is used to form the middle layer 4, if the film has a thickness of more than 200 µm, there will be too large a stress caused due to hardening and contraction thereof.

Referring again to FIG. 2e, the light-transmissible sheet 4a may be continuously supplied from a reel 11. Before being introduced into a position between two half-finished disc products, such a light-transmissible sheet 4a is in a state of being covered by a base layer 4b comprising polyethylene terephthalate (PET) film and a cover layer 4c comprising a polyethylene (PE) film. In operation, the base layer 4b is wound around a small reel 15, the cover layer 4c is wound round another small reel 14, so that both surfaces of the light-trasmissible sheet 4a are exposed. In this way, the light-transmissible sheet 4a may be introduced into a position between two half-finished disc products, with one surface facing the first protection film 3 and another surface facing the second protection film 5.

Afterwards, as illustrated in FIG. 2f, a half-finished disc product produced in the steps of FIGS. 2a–2b and a half-fished disc product produced in the steps of FIGS. 2c–2d, are brought together with the light-transmissible sheet 4a interposed therebetween, and then firmly pressed together by means of a method called roll pressing or a method called vacuum pressing, so as to form a desired two-disc laminated structure.

FIG. 2f shows a method called roll pressing. As shown in FIG. 2f, an over-roll 31 and an under-roll 32 are used to perform the desired pressing operation. In this way, the light-transmissible sheet 4a interposed between the two half-finished disc products is pressed from either side by the two rolls 31 and 32. In this way, air bubbles possibly entered in the light-transmissible sheet 4a will be driven out therefrom, so as to ensure that a final product will contain very few air bubbles in the middle layer 4. In actual operation of roll pressing, an desired pressure for roll pressing is 0.05–50 kg/cm$^2$, preferably 5–20 kg/cm$^2$. A speed at which the light-transmissible sheet 4a is supplied from the reel 11 (by means of the over-roll 31 and the under-roll 32) is 0.05–10 m/min, preferably 0.1–2 n/min.

A two-disc laminated optical disc produced in the steps of FIG. 2f is further trimmed by means of a cutter 20, so that it is easy to remove unwanted portions of the light-transmissible sheet 4a, i. e., a part located in the center hole of the disc and a part extending outwardly from the outer circumferential edge of the disc.

Subsequently, as shown in FIG. 2g, the two-disc laminated optical disc, while still in a pressed condition (pressed by the same pressing force as in the step of FIG. 2f), is irradiated with an ultraviolet light irradiating from below the first light-transmissible substrate 1 (as viewed in FIG. 2g). In this way, the first and second protection films 3, 5, and the middle layer 4 (if it is not a light-transmissible adhesive sheet, but a light-transmissible ultraviolet-hardening film) are simultaneously hardened, thus obtaining a desired two-disc laminated optical disc as a completed product.

Since the first reflecting film 2 and the first protection film 3 are all at least translucent (semi light-transmissible), if the middle layer 4 is a light-transmissible ultraviolet-hardening film, such a film (if not yet hardened) may be hardened by means of irradiation with an ultraviolet light irradiating from below (as viewed in FIG. 2g) the first light-transmissible substrate 1. In practice, the irradiating energy of the ultraviolet light is required to be 100 mJ/cm$^2$, preferably 1000 mJ/cm$^2$.

FIGS. 3a–3h are explanatory views illustrating a method of producing a two-disc laminated optical video disc, according to a second embodiment of the present invention.

Similar to the first embodiment of the present invention, a first and second light-transmissible substrates 1 and 7, are prepared having information pits 8 formed on one surface of each substrate. In fact, the first and second light-transmissible substrates 1, 7 are successively produced in an injection molding machine having a stamper installed in a cavity thereof, by virtue of an injection molding process using a transparent resin such as polycarbonate.

Figure 3:
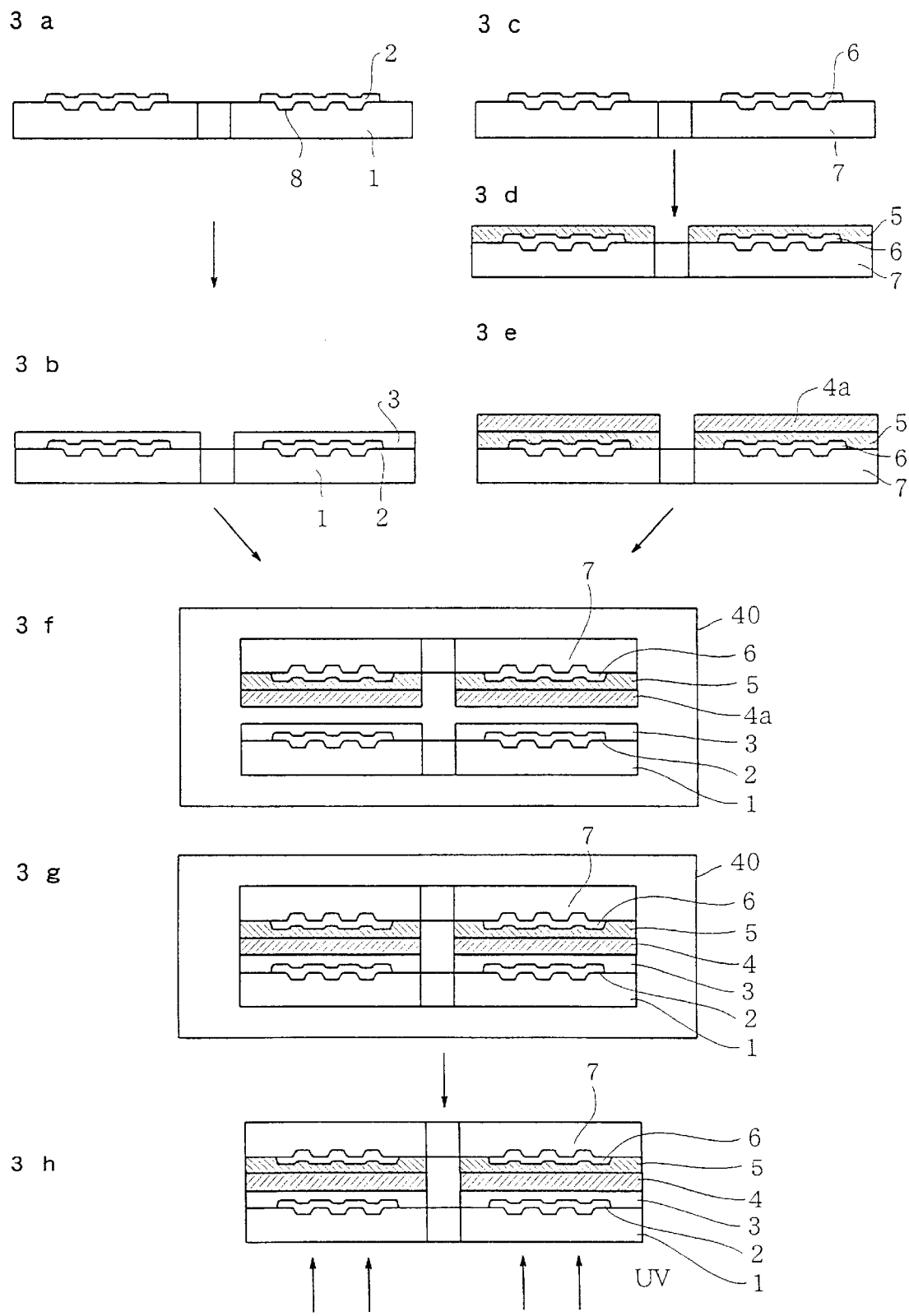
FIGS. 3a–3h are explanatory views illustrating a method of producing a two-disc laminated optical video disc, according to a second embodiment of the present invention.

Then, as shown in FIG. 3a, a first reflecting film 2 is formed on the first light-transmissible substrate 1, by performing a sputterring treatment on the substrates 1, except on a non-recording portion in an inner circumferential area and a non-recording portion in an outer circumferential area.

Afterwards, as shown in FIG. 3b, the first protection film 3 is formed on the first reflecting film 2, by applying a liquid ultraviolet-setting resin, using a method called spin coating. In detail, the liquid ultraviolet-setting resin, under room temperature and before hardening, has a viscosity of 15–400 cps, preferably 15–50 cps.

At the same time, as shown in FIG. 3c, a second reflecting film 6 is formed on the second light-transmissible substrate 7, by performing a sputterring treatment on the substrates 7, except on a non-recording portion in an inner circumferential area and a non-recording portion in an outer circumferential area.

Afterwards, as shown in FIG. 3d, a second protection film 5 is formed on the second reflecting film 6, by applying a liquid ultraviolet-setting resin, using a method called spin coating. In detail, the liquid ultraviolet-setting resin, under room temperature and before hardening, has a viscosity of 15–400 cps, preferably 15–50 cps, and a thickness of 5–10 μm after application. Upon being irradiated with an ultraviolet light, the liquid ultraviolet-setting resin is hardened, thus forming the second protection film 5.

Subsequently, as shown in FIG. 3e, a light-transmissible sheet 4a is laminated on the second protection film 5, by virtue of a method called roll lamination. In detail, the light-transmissible sheet 4a is, either a light-transmissible adhesive sheet made of a light-transmissible acrylic adhesive agent, or a light-transmissible ultraviolet-hardening film, both of which in an unhardened state have a thickness of 30–60 μm. The light-transmissible ultraviolet-hardening film, under a room temperature and before hardening, has a viscosity of 3,500–400,000 P, preferably 20,000–400,000 P. In fact, the light-transmissible ultraviolet-hardening film contains substantially no solvent and may undergo hardening upon being irradiated with an ultraviolet light.

After that, referring to FIG. 3f, the first substrate 1 coated with the first reflecting film 2 and further coated with the first protection film 3 (made of an ultraviolet-setting resin, not yet hardened), the second substrate 7 coated with the second reflecting film 6 and further covered with the second protection film 5 and the light-transmissible sheet 4a, are disposed into a chamber 40, with the first substrate 1 disposed at a lower position. At this time, a light-transmissible sheet 4a is caused to face the protection film 3 but is separated therefrom for a small distance.

Then, the pressure within the chamber 40 is reduced so as to create a vacuum condition, thus the first and second substrates 1, 7 may be drawn together and laminated one upon another as shown in FIG. 3g, with the use of a predetermined pressure which is adjusted such that there will be no any outward movement of the liquid ultraviolet-setting resin.

Referring to FIG. 3h, after the vacuum condition within the chamber 40 is released, the first and second substrates 1, 7 are further bonded together by virtue of a predetermined pressure, so as to form a two-disc laminated structure. During this process, air bubbles possibly occurring in bonding-together operation will be broken so as to disappear.

Meanwhile, an ultraviolet light irradiating from below (as viewed in FIG. 3h) the first substrate 1 is used to irradiate the two-disc laminated structure, so as to promote the hardening of the protection film 3. On the other hand, if a light-transmissible ultraviolet-hardening film is used to form the light-transmissible sheet 4a (middle layer), not only the protection film 3 but also the ultraviolet-hardening film 4a may be hardened by the irradiation with the ultraviolet light.

FIGS. 4a–4i are explanatory views illustrating a method of producing a two-disc laminated optical video disc, according to a third embodiment of the present invention.

Similar to the first embodiment of the present invention, a first and second light-transmissible substrates 1 and 7, are prepared having information pits 8 formed on one surface of each substrate. In fact, the first and second light-transmissible substrates 1, 7 are successively produced in an injection molding machine having a stamper installed in a cavity thereof, by virtue of an injection molding process using a transparent resin such as polycarbonate.

Figure 4:
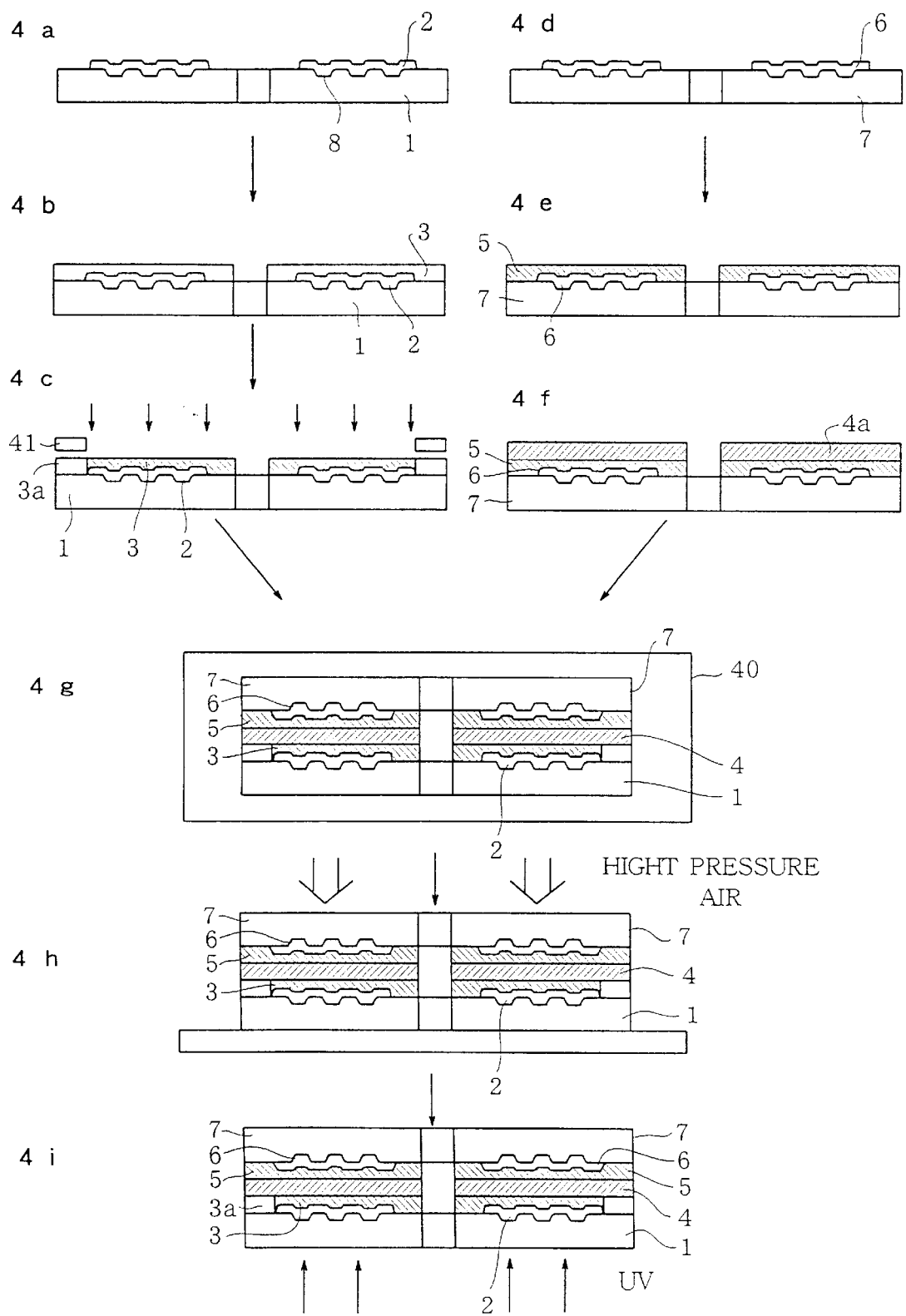
FIGS. 4a–4i are explanatory views illustrating a method of, producing a two-disc laminated optical video disc, according to a third embodiment of the present invention.

Then, as shown in FIG. 4a, a first reflecting film 2 is formed on the first light-transmissible substrate 1, by performing a sputterring treatment on the substrates 1, except on a non-recording portion in an inner circumferential area and a non-recording portion in an outer circumferential area.

Afterwards, as shown in FIG. 4b, the first protection film 3 is formed on the first reflecting film 2, by applying a liquid ultraviolet-setting resin, using a method called spin coating. In detail, the liquid ultraviolet-setting resin, under room temperature and before hardening, has a viscosity of 15–400 cps, preferably 15–50 cps. Subsequently, referring to FIG. 4c, a non-recording outer circumferential area of the first substrate 1 is masked by a mask means 41. Then, the first substrate 1 is irradiated with an ultraviolet light, so as to solidify the ultraviolet-setting resin coated on the first reflecting film 2 except the non-recording outer circumferential area. As a result, the resin coated on the outer circumferential area of the first substrate 1 may be kept at an unhardened state.

At the same time, as shown in FIG. 4d, a second reflecting film 6 is formed on the second light-transmissible substrate 7, by performing a sputterring treatment on the substrates 7, except on a non-recording portion in an inner circumferential area and a non-recording portion in an outer circumferential area.

Afterwards, as shown in FIG. 4e, a second protection film 5 is formed on the second reflecting film 6, by applying a liquid ultraviolet-setting resin, using a method called spin coating. In detail, the liquid ultraviolet-setting resin, under room temperature and before hardening, has a viscosity of 15–400 cps, preferably 15–50 cps, and a thickness of 5–10 μm after application. Upon being irradiated with an ultraviolet light, the liquid ultraviolet-setting resin is hardened, thus forming the second protection film 5.

Subsequently, as shown in FIG. 4f, a light-transmissible sheet 4a is laminated on the second protection film 5, by virtue of a method called roll lamination. In detail, the light-transmissible sheet 4a is, either a light-transmissible adhesive sheet made of a light-transmissible acrylic adhesive agent, or a light-transmissible ultraviolet-hardening film, both of which in an unhardened state have a thickness of 30–60 μm. The light-transmissible ultraviolet-hardening film, under a room temperature and before hardening, has a viscosity of 3,500–400,000 P, preferably 20,000–400,000 P. In fact, the light-transmissible ultraviolet-hardening film contains substantially no solvent and may undergo hardening upon being irradiated with an ultraviolet light.

After that, referring to FIG. 4g, the first substrate 1 coated with the first reflecting film 2 and further coated with the first protection film 3 (made of an ultraviolet-setting resin, not yet hardened), the second substrate 7 coated with the second reflecting film 6 and further covered with the second protection film 5 and the light-transmissible sheet 4a, are disposed into a chamber 40, with the first substrate 1 disposed at a lower position. At this time, a light-transmissible sheet 4a is caused to face the protection film 3 but is separated therefrom for a small distance.

Then, the pressure within the chamber 40 is reduced so as to create a vacuum condition, thus the first and second substrates 1, 7 may be drawn together and laminated one upon another, with the use of a predetermined pressure which is adjusted such that there will be no any outward movement of the liquid ultraviolet-setting resin.

Referring to FIG. 4h, after the vacuum condition within the chamber 40 is released, the first and second substrates 1, 7 are further bonded together by virtue of a high pressure air, so as to form a desired two-disc laminated structure. At this moment, a problem of air bubbles possibly occurring and remaining in the outer edge portions of the first and second substrates 1 and 7, may be solved by virtue of a flowability of the liquid ultraviolet-setting resin.

Afterwards, an ultraviolet light irradiating from below (as viewed in FIG. 4i) the first substrate 1 is used to irradiate the two-disc laminated structure, so as to promote the hardening of the protection film 3. On the other hand, if a light-transmissible ultraviolet-hardening film is used to form the light transmissible sheet 4a, not only the protection film 3 but also the ultraviolet-hardening film may be hardened by the irradiation with the ultraviolet light.

FIGS. 5a–5g are explanatory views illustrating a method of producing a two-disc laminated optical video disc, according to a fourth embodiment of the present invention.

Similar to the first embodiment of the present invention, a first and second light-transmissible substrates 1 and 7, are prepared having information pits 8 formed on one surface of each substrate. In fact, the first and second light-transmissible substrates 1, 7 are successively produced in an injection molding machine having a stamper installed in a cavity thereof, by virtue of an injection molding process using a transparent resin such as polycarbonate.

Figure 5:
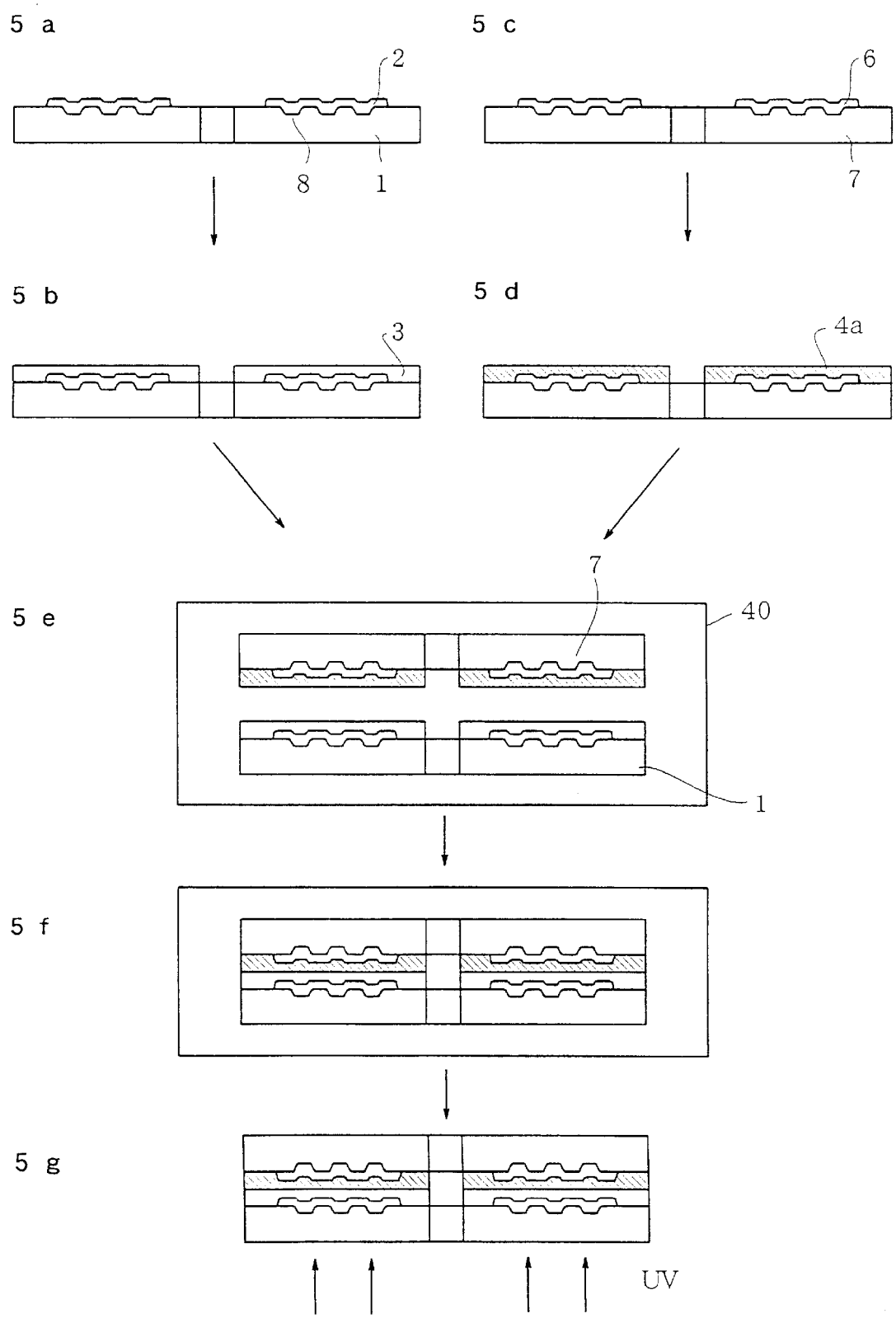
FIGS. 5a–5g are explanatory views illustrating a method of producing a two-disc laminated optical video disc, according to a fourth embodiment of the present invention.

Then, as shown in FIG. 5a, a first reflecting film 2 is formed on the first light-transmissible substrate 1, by performing a sputterring treatment on the substrates 1, except on a non-recording portion in an inner circumferential area and a non-recording portion in an outer circumferential area.

Afterwards, as shown in FIG. 5b, the first protection film 3 is formed on the first reflecting film 2, by applying a liquid ultraviolet-setting resin, using a method called spin coating. In detail, the liquid ultraviolet-setting resin, under room temperature and before hardening, has a viscosity of 15–400 cps, preferably 15–50 cps.

At the same time, as shown in FIG. 5c, a second reflecting film 6 is formed on the second light-transmissible substrate 7, by performing a sputterring treatment on the substrates 7, except on a non-recording portion in an inner circumferential area and a non-recording portion in an outer circumferential area.

Afterwards, as shown in FIG. 5d, a light-transmissible sheet 4a is laminated on the second reflecting film 6, by virtue of a method called roll lamination. In detail, the light-transmissible sheet 4a is, either a light-transmissible adhesive sheet made of a light-transmissible acrylic adhesive agent, or a light-transmissible ultraviolet-hardening film, both of which in an unhardened state have a thickness of 30–60 μm. The light-transmissible ultraviolet-hardening film, under a room temperature and before hardening, has a viscosity of 3,500–400,000 P, preferably 20,000–400,000 P. In fact, the light-transmissible ultraviolet-hardening film contains substantially no solvent and may undergo hardening upon being irradiated with an ultraviolet light.

After that, referring to FIG. 5e, the first substrate 1 coated with the first reflecting film 2 and further coated with the first protection film 3 (made of an ultraviolet-setting resin, not yet hardened), the second substrate 7 coated with the second reflecting film 6 and further covered with the light-transmissible sheet 4a, are disposed into a chamber 40, with the first substrate 1 disposed at a lower position. At this time, a light-transmissible sheet 4a is caused to face the protection film 3 but is separated therefrom for a small distance.

Then, the pressure within the chamber 40 is reduced so as to create a vacuum condition, thus the first and second substrates 1, 7 may be drawn together and laminated one upon another, with the use of a predetermined pressure which is adjusted such that there will be no any outward movement of the liquid ultraviolet-setting resin.

Referring to FIG. 5f, after the vacuum condition within the chamber 40 is released, the first and second substrates 1, 7 are further bonded together by virtue of a predetermined pressure, so as to form a two-disc laminated structure. During this process, air bubbles possibly occurring in bonding-together operation will be broken so as to disappear.

Meanwhile, an ultraviolet light irradiating from below (as viewed in FIG. 5g) the first substrate 1 is used to irradiate the two-disc laminated structure, so as to promote the hardening of the protection film 3. On the other hand, if a light-transmissible ultraviolet-hardening film is used to form the light-transmissible sheet 4a (middle layer), not only the protection film 3 but also the ultraviolet-hardening film 4a may be hardened by the irradiation with the ultraviolet light.

FIGS. 6a–6h are explanatory views illustrating a method of producing a two-disc laminated optical video disc, according to a fifth embodiment of the present invention.

The fifth embodiment shown in FIGS. 6a–6h is similar to the second embodiment shown in FIGS. 3a–3h except the following points.

(a) The inner diameter of the center hole of the light-transmissible sheet 4a is made slightly larger than that in the second embodiment, while the outer diameter of the sheet 4a is made slightly smaller.

Figure 6:
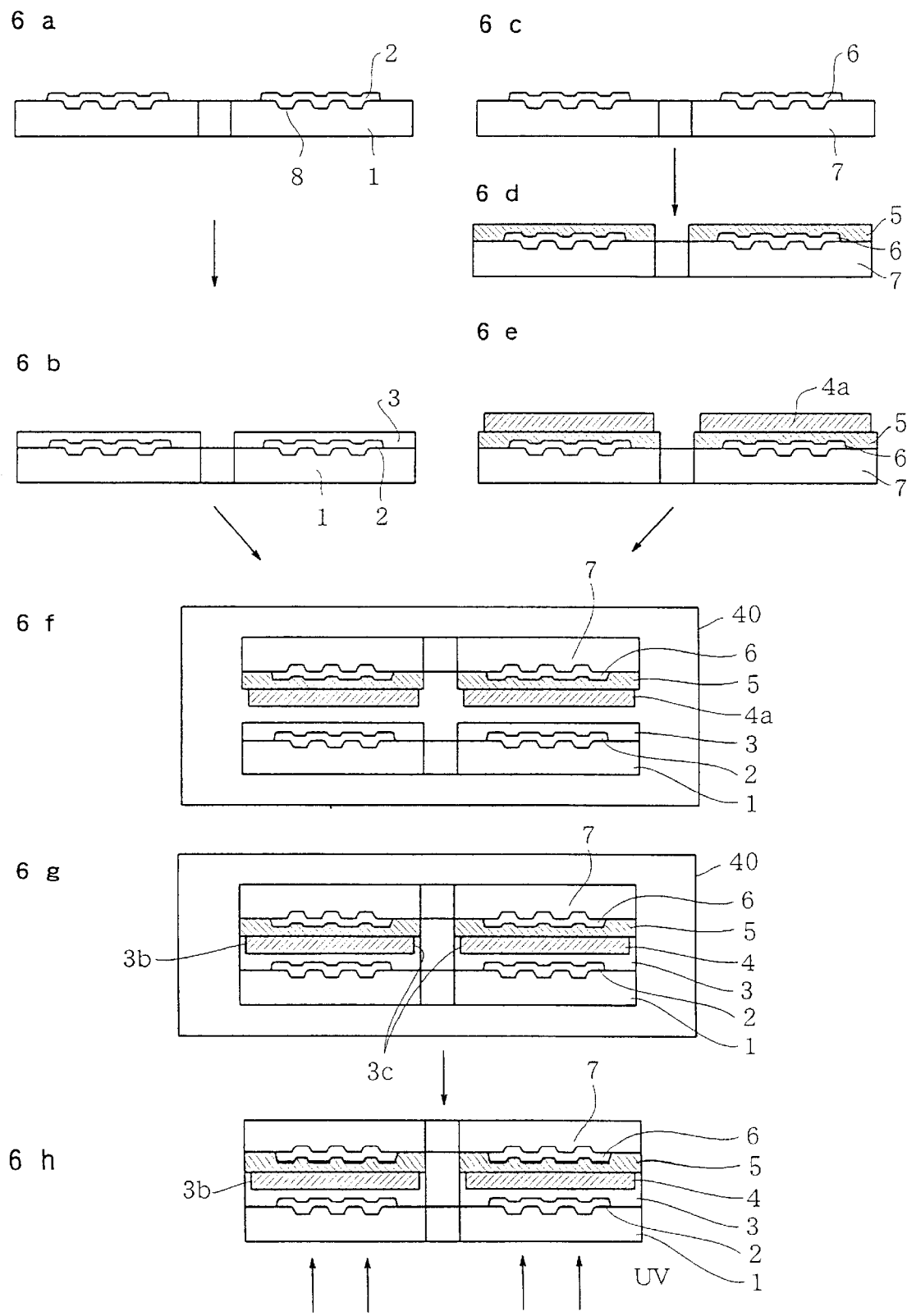
FIGS. 6a–6h are explanatory views illustrating a method of producing a two-disc laminated video disc, according to a fifth embodiment of the present invention.

(b) In a process of FIG. 6g where the first and second substrates 1, 7 are bonded together, the liquid ultraviolet-setting resin is caused to flow slightly from the inner circumferential edge and the outer circumferential edge of a two-disc laminated structure, thereby coverring the inner circumferential edge 3c and the outer circumferential edge 3b of the light-transmissible sheet 4a and getting in contact with the second protection film 5. In this way, the light-transmissible sheet 4a may be covered by the liquid ultraviolet-setting resin, as shown in FIGS. 6g and 6h.

(c) In a process of FIG. 6h, an ultraviolet light is irradiating from below the first substrate 1 to irradiate the two-disc laminated structure so as to solidify the liquid ultraviolet-setting resin. In this way, since the inner circumferential edge and the outer circumferential edge of the two-disc laminated structure may be covered and fixed by ring-like solidified resin, thereby effectively promoting a mutual adhesion between the two discs.

Upon completion of the ultraviolet irradiation, a finally obtained two-disc laminated substrate will be in a condition where the two discs and light-transmissible adhesive sheet are bonded together exactly and reliably by virtue of solidified ultraviolet-setting resin fixed on the inner circumferential edge and the outer circumferential edge of the two-disc laminated structure.

When a light-transmissible adhesive sheet 4a is used, it can produce a higher softness than other kinds of film (such as an ultraviolet-hardening film). However, after two discs are bonded together with the light-transmissible adhesive sheet 4a interposed therebetween, there is a possibity that each of the two discs will have a relative movement with respect to one another. For this reason, it is necessary to form a rink-like solidified resin on each of the inner circumferential edge and the outer circumferential edge of the two-disc laminated structure, so as to prevent such a relative movement.

With the use of the present invention, there have been provided at least the following advantages.

(1) Since a liquid ultraviolet-setting resin is applied to the surfaces of the first and second reflecting films, and since a light-transmissible sheet is interposed between two half-finished disc products when they are being bonded together, an undesired stress may be prevented from occurring on the first and second reflecting films, so that it is possible to prevent a crack phenomenon from occurring on a middle layer, obtaining a uniform middle layer in a completed two-disc laminated optical disc.

(2) Since the ultraviolet-setting resin for forming protection films has a viscosity of 15–400 cps in an unhardened state and a thickness of only 5–10 μm under a room temperature, it is possible to neglect any undesired influence possibly brought about by the protection films to the entire thickness structure of a two-disc laminated optical disc, thereby enabling a two-disc laminated optical disc to have a high stabilized quality.

(3) Since the middle layer is formed either by a ultraviolet-hardening film which under room temperature and in an unhardened state has a viscosity of 3,500–400,000 P and a thickness of 30–60 μm, or by an adhesive sheet made of an acrylic adhesive agent having a thickness of 30–60 μm, it is possible to neglect any influence possibly brought about by the middle layer to the entire thickness structure of a two-disc laminated optical disc.

(4) Since the first reflecting film is either a metal film or a dielectric film, each capable of partially transmitting a laser beam, it is necessary to have only one laser beam irradiating in only one direction for reading information recorded on both discs.

(5) Since two half-finished disc products are bonded together in a chamber under a vacuum condition, it is possible to prevent air from mixing into an ultraviolet-setting resin layer coated on a disc substrate for forming a protection film, thereby preventing the formation of air bubbles in the protection film.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A method of producing a two-disc laminated optical disc, comprising steps of:
    forming, on an information recording surface of a first light-transmissible substrate, a first reflecting film capable of partially reflecting and partially transmitting a laser beam;
    forming, on an information recording surface of a second light-transmissible substrate, a second reflecting film having a reflectance higher than that of the first reflecting film;
    applying a liquid ultraviolet-setting resin to the first reflecting film formed on the first light-transmissible substrate and the second reflecting film formed on the second light-transmissible substrate;
    bonding together the above treated first light-transmissible substrate and the second light-transmissible substrate, with a light-transmissible middle layer interposed therebetween;
    solidifying the liquid ultraviolet-setting resin, by means of an ultraviolet light directed through the first light-transmissible substrate;
    wherein the first light-transmissible substrate and the second light-transmissible substrate are bonded together first in a vacuum condition, then by means of press using a high pressure air.

2. A method of producing a two-disc laminated optical disc, comprising the following steps:
    forming, on an information recording surface of a first light-transmissible substrate, a first reflecting film capable of partially reflecting and partially transmitting a laser beam;
    forming, on an information recording surface of a second light-transmissible substrate, a second reflecting film having a reflectance higher than that of the first reflecting film;
    applying a liquid ultraviolet-setting resin to the first reflecting film formed on the first light-transmissible substrate and/or the second reflecting film formed on the second light-transmissible substrate;
    bonding together the above-treated first light-transmissible substrate and the second light-transmissible substrate, with a light-transmissible middle layer interposed therebetween; and
    solidifying the liquid ultraviolet-setting resin, by means of an ultraviolet light directed through the first light-transmissible substrate;
    wherein the light-transmissible middle layer is formed by a light-transmissible adhesive sheet having a thickness of 30–60 μm,
    wherein the step of bonding together the above-treated first light-transmissible substrate and the second light-transmissible substrate is carried out under a vacuum condition, followed by a pressing treatment under high pressure air;
    wherein the step of solidifying the liquid ultraviolet-setting resin by means of an ultraviolet light is carried out under an atmospheric pressure.

3. A method of producing a two-disc laminated optical disc, comprising the following steps:
    forming, on an information recording surface of a first light-transmissible substrate, a first reflecting film capable of partially reflecting and partially transmitting a laser beam;
    forming, on an information recording surface of a second light-transmissible substrate, a second reflecting film having a reflectance higher than that of the first reflecting film;
    applying a liquid ultraviolet-setting resin to the first reflecting film formed on the first light-transmissible substrate and/or the second reflecting film formed on the second light-transmissible substrate;
    bonding together the above-treated first light-transmissible substrate and the second light-transmissible substrate, with a light-transmissible middle layer interposed therebetween;
    solidifying the liquid ultraviolet-setting resin by means of an ultraviolet light directed through the first light-transmissible substrate;
    in the step of bonding together the first light-transmissible substrate and the second light-transmissible substrate, an inner circumferential edge and an outer circumferential edge of the light-transmissible middle layer are covered by the liquid ultraviolet-setting resin flowed to these edges;
    in the step of solidifying the liquid ultraviolet-setting resin, the liquid ultraviolet-setting resin covering the inner circumferential edge and the outer circumferential edge of the light-transmissible middle layer is solidified so as to fix the inner circumferential edges and the outer circumferential edges of the first and second light-transmissible substrates,
    wherein the step of bonding together the above-treated first light-transmissible substrate and the second light-transmissible substrate is carried out under a vacuum condition, followed by a pressing treatment using high pressure air,
    wherein the step of solidifying the liquid ultraviolet-setting resin by means of an ultraviolet light is carried out under an atmospheric pressure.

* * * * *